United States Patent [19]
Behringer et al.

[11] Patent Number: 5,778,782
[45] Date of Patent: Jul. 14, 1998

[54] DEVICE FOR PROCESSING WEBS OR SHEETS OF PAPER BETWEEN TWO JOINTLY OPERATING WORKING CYLINDERS OF A PROCESSING UNIT

[75] Inventors: Richard Behringer, Utzenfeld; Juergen Rudiger, Zell, both of Germany

[73] Assignee: GRAPHA-Holding AG, Hergiswil, Switzerland

[21] Appl. No.: 793,529

[22] PCT Filed: Jul. 11, 1996

[86] PCT No.: PCT/CH96/00255
§ 371 Date: Feb. 27, 1997
§ 102(e) Date: Feb. 27, 1997

[87] PCT Pub. No.: WO97/03780
PCT Pub. Date: Feb. 6, 1997

[30] Foreign Application Priority Data
Jul. 20, 1995 [CH] Switzerland ............ 02 135/95-9

[51] Int. Cl.⁶ .................. B41F 13/40; B26D 1/36; B26F 1/20
[52] U.S. Cl. .................. 101/226; 101/247; 83/343

[58] Field of Search ................ 101/152, 153, 101/216, 247, 182, 183, 224, 225, 226, 227, 228, 218, 184, 185, 139, 140, 143, 144, 145; 83/343, 344, 345

[56] References Cited
U.S. PATENT DOCUMENTS
5,060,569 10/1991 Gladow ............ 101/216
5,588,361 12/1996 Riis ............ 101/216

FOREIGN PATENT DOCUMENTS
0236499 9/1987 European Pat. Off. .
0390689 10/1990 European Pat. Off. .
2046664 11/1980 United Kingdom .

*Primary Examiner*—J. Reed Fisher
*Attorney, Agent, or Firm*—Spencer & Frank

[57] ABSTRACT

In a web-fed rotary press for processing web-shaped materials, the latter run between two working rollers (3, 4) that are arranged in side bearing housings (8, 9). The working rollers (3, 4) that are connected via the bearing housings (8, 9) to a machine column (14) are prestressed in the operating position by a lifting mechanism (15) and are lifted away from each other as well as installed and removed.

15 Claims, 3 Drawing Sheets

DEVICE FOR PROCESSING WEBS OR SHEETS OF PAPER BETWEEN TWO JOINTLY OPERATING WORKING CYLINDERS OF A PROCESSING UNIT

BACKGROUND OF THE INVENTION

The invention concerns a web-fed rotary press for processing webs or sheets of paper, textiles or synthetic materials, running between two counterrotating, jointly operating working rollers of a processing unit, where the mutually tensioned working cylinders are individually and removably connected via their bearing housings on the side to a machine column for the device.

Among other things, this relates to devices for perforating, punching, hole-punching and cutting of the aforementioned materials, which have at least two working rollers or tool cylinders that counterrotate around parallel rotational axes in the approach range and operate jointly as a processing unit.

In this case, the working rollers are supported mutually running on bearer rings or the latter are pressed against each other via side-installed bearing housings for the working rollers or cylinders in such a way that a small gap of approximately 0.2 mm exists between the contact surfaces of the bearing housings.

The pressing against each other of the bearer rings is achieved, among other things, by screwing together the side-installed end plates for the working rollers.

For a perforating unit with perforating tools, another requirement is that the joint operation of two perforating tool components can be stopped by lifting them off, without completely relinquishing the meshing of the opposite arranged driving wheels, by distancing the bearer rings, which is designed to stop or control the operation of the perforating unit or to prevent damage to the glued joint of a paper web.

In addition, it must be ensured that the working rollers can be replaced easily.

At present, the bearer rings are pressed together with respectively at least two screws, assigned to a bearing housing pair, which are arranged at a distance to a plane that runs through the rotational axes for the perforating tools or working rollers.

A block and pulley or the like was required to lift up, lift out or replace a working roller or a cylinder, which did not permit an exact positioning however.

SUMMARY OF THE INVENTION

It is an object of the invention to create a device of the aforementioned type, which can be used universally and permits an exact positioning based on the exacted requirements and the conditions.

The solution according to the invention is that a lifting mechanism is arranged on the machine column for prestressing the working rollers in the operating position, which is designed for the installation and removal from the side.

A balanced prestressing force can be effected with this between the working rollers or in the processing unit and an exact lifting, installation and removal can be carried out.

This involves perforating devices for longitudinal and lateral perforations, meaning with disc-shaped or cylindrical working rollers, punching or stamping devices as well as cutting devices, in particular cross cutters.

BRIEF DESCRIPTION OF THE DRAWINGS

The invention is explained in the following with the aid of an embodiment and by referring to the drawing, to which we refer with respect to all details not explained further in the description. Shown in the drawing are.

DETAILED DESCRIPTION OF THE INVENTION

Figure 2:
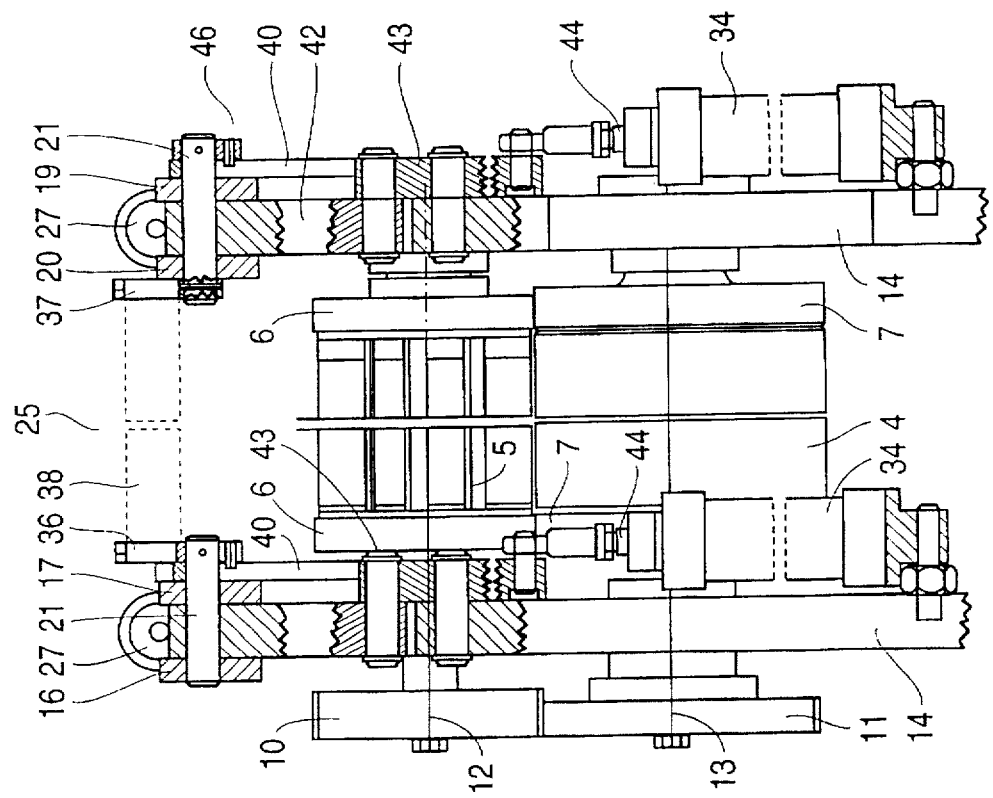
FIG. 2 A cross section along the line 2—2 in FIG. 1.
Figure 1:
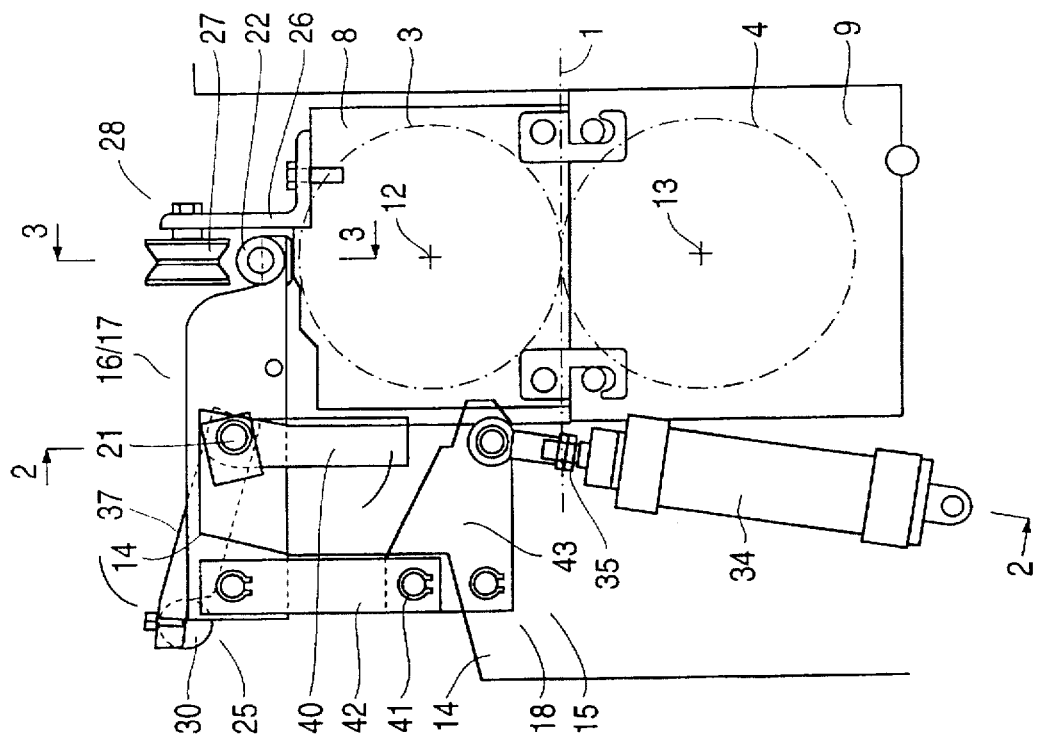
FIG. 1 A view from the side of a lateral perforation device based on an embodiment according to the invention.

FIGS. 1 and 2 illustrate an embodiment of the invention on a lateral perforation device for a paper web 1. For this, the trajectories of the above-positioned lateral perforation cylinder 3 or tool cylinder and a smooth anvil cylinder 4 are indicated in FIG. 1 with dash-dot line circles, whereas the perforating knives 5 are shown in FIG. 2 across the width of the perforating cylinder 3. Both cylinders 3, 4 are positioned mutually stressed in side bearing housings 8, 9 via side bearer rings 6 that roll one on top of the other. The rotation in opposite direction is shown by the two toothed gears 10, 11 and the corresponding rotational axes 12, 13.

FIG. 1 indicates the machine column 14, with which the perforation device is removably connected. Perforation cylinder 3 and anvil cylinder 4 form a processing unit. The prestressing of cylinders 3, 4, the lifting of perforation cylinder 3 from the anvil cylinder 4 to a non-operating position and the replacement of one or both cylinders 3, 4 takes place with a lifting mechanism 15, which is connected to the machine column 14.

The lifting mechanism 15 comprises two levers 16, 17 that respectively act upon the bearing housings 8 of perforation cylinder 3 in the plane formed by the rotational axes 12, 13. These levers are designed with two arms and are installed such that they can pivot on the machine column 14. In this case, the one, free end of lever 16, 17 faces the bearing housing 8 and the opposite lever end is connected to an activation device 18. The levers 16, 17 are formed by two uniform, parallel lever components 19, 20, which are positioned on a shaft 21 that is arranged in the machine column 14.

The lever end coordinated with the perforation device has an upward facing receptacle 22 and a tensioning bracket 23 on the opposite side, facing the bearing housing 8. The receptacle 22 is used for lifting up and removing the cylinders 3, 4 in or from the machine column 14 or the installation of the cylinder 3, 4. The receptacle 22 is a component of a sliding track 24 that runs parallel to the rotational axes 12, 13 of cylinders 3, 4 or lateral to the paper web 1 and which can be interrupted between the levers 16, 17 by a connecting element 25 that can be advanced.

A roller 27 for a lifting frame 28 that rotates freely in a frame 26, which is screwed to the bearing housing 8, is arranged above a receptacle 22. The upper or both cylinders 3, 4 can be lifted jointly or lowered and moved from side to side on said lifting frame, provided the sliding track 24 is not interrupted. By lifting the levers 16, 17, the upper cylinder 3 or both cylinders 3, 4 are jointly lifted from the operating position. The advancing of the connecting element 25, so that together with the receptacles 22 a level sliding track 24 develops, occurs with the aid of a pivoting movement of approximately 180° around the axis for shaft 21 on which the levers 16, 17 are positioned. The ends of levers 16, 17 that hold the receptacles 22 have a tensioning bracket 29, which faces the bearing housing 8 and can be admitted by a force buffer.

The receptacle 22 on the lever ends has a component 30 for the sliding track 24, for example in the form of a cylindrical structural steel, which has a recess 31 that forms the fastening surface for the tensioning bracket 29 and for the detachable screw-connection with the lever end. The tensioning bracket is composed of a supporting disc 32, guided movably inside a bore of component 30. A compression spring 33 is suspended between it and the fastening surface, in this case a disc spring as force buffer.

Figure 3:
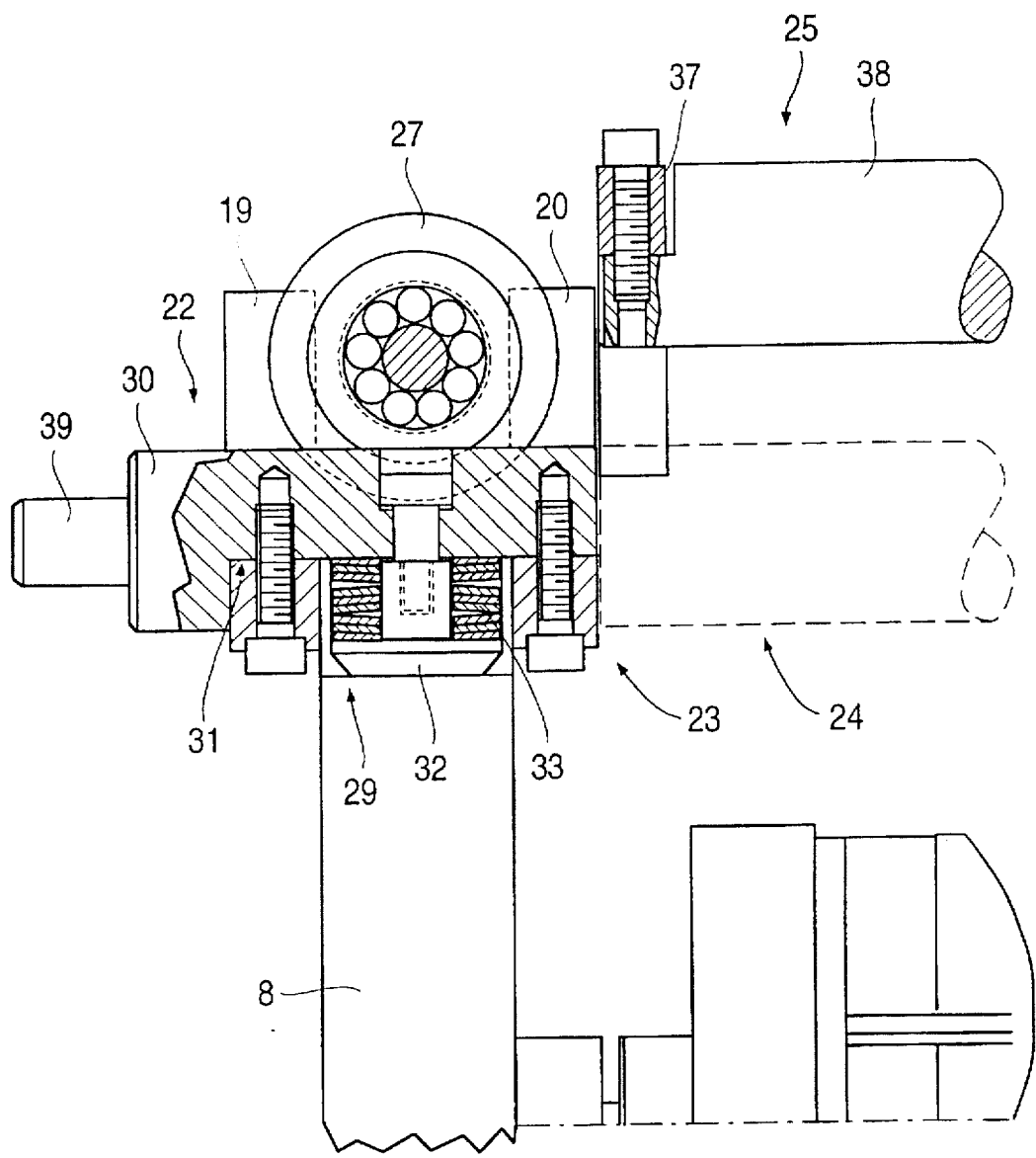
FIG. 3 An enlarged sectional illustration of a segment along the line 3—3 in FIG. 1.

In the prestressing function, the levers 16, 17 respectively are placed in a prestressed position according to FIGS. 1 and 3, a position determined by a stop 35, by a lifting cylinder 34 that is supported on the machine column 14, so that the compression springs 33 can exert the prestressing pressure onto the bearing housings 8, 9. The prestressing pressure can be determined optionally through the selection of a compression spring 33. The connecting element 25 in a non-operating position is designed with pivoting levers 36, 37 on the ends, which are fastened between the levers 16, 17 on the shaft 21. The rail-shaped connecting element 25 as intermediate component 38 has the same running profile as the components 30 and, in the operating position, rests on the supporting elements for the components (not visible), thereby forming an even rail transition.

Figure 4:
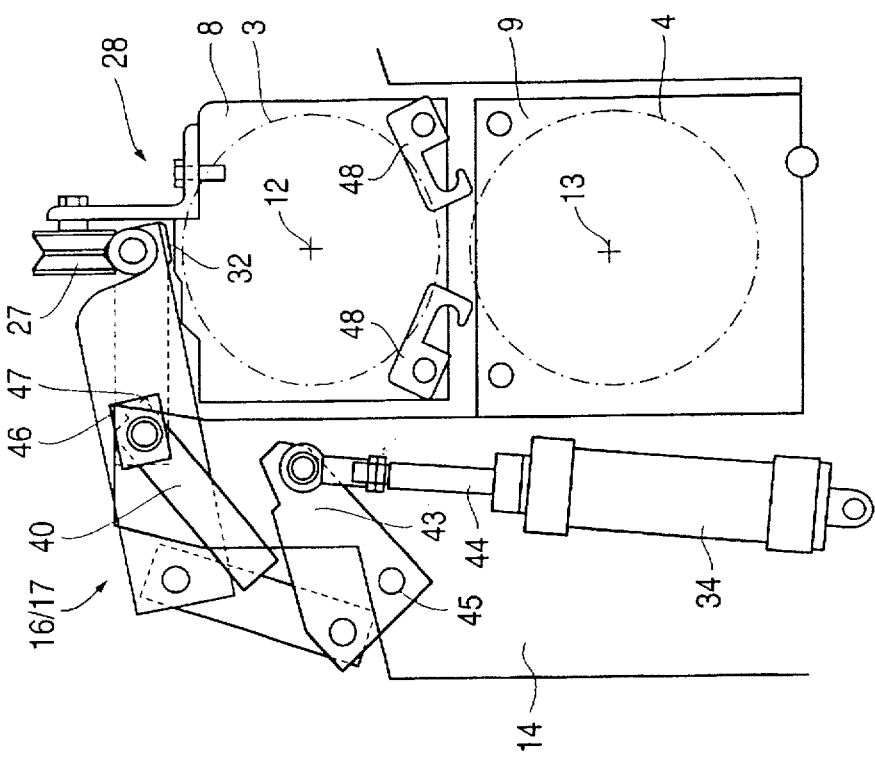
FIG. 4 A view from the side of the embodiment according to FIG. 1, while the lateral perforation device is not in operation.

The supporting element 39 that projects from the side of the receptacle 22 is designed to accept an extension of the sliding track 24 for the side installation or removal of the cylinders 3, 4, which are connected to the drivable lifting frame 28. FIG. 4 shows a position of non-operation for the perforating cylinder 3, in which the latter is lifted by several tenths of millimeters from the anvil cylinder 4, as defined or limited by the inserted detent pawl 40, so that the cutting engagement with the web passing through is interrupted. The toothed gears for both cylinders 3, 4, however, remain engaged to maintain the cutting format. This lifting place is limited by a detent pawl 40, which is coupled with the pivoting movement of the connecting element 25. FIG. 1 shows the detent pawl 40 with pivoted-back connecting element 25 in the blocking position, aligned such that it is approximately vertically suspended. The levers 16, 17 are adjusted to prestressing of the cylinders 3, 4, wherein the nut on the pulled-back piston for lifting cylinder 34 functions as stop 35.

The activation devices 18 that are designed as a lever gear comprise respectively two levers 42, 43 that form a knee joint 41. This lever gear connects on the one hand the lever 16, 17 on the lever end that faces the tensioning bracket 23 on the pivoting axis, and on the other hand the piston rod 44 of the lifting cylinder 34. The lever 43 as double lever with two lever arms arranged at a right angle to each other, forms together with the lever 42 a joint articulated lever, which can be placed in a stiff dead center position, so that the lifting cylinder 34 is not stressed in this position.

In the non-operating position according to FIG. 4, the position of the activation device 18 is illustrated, wherein lever 43 supports itself on the free end of the detent pawl 40 and the knee joint 41 formed by the levers 42, 43 is moved from the dead center position.

Figure 5:
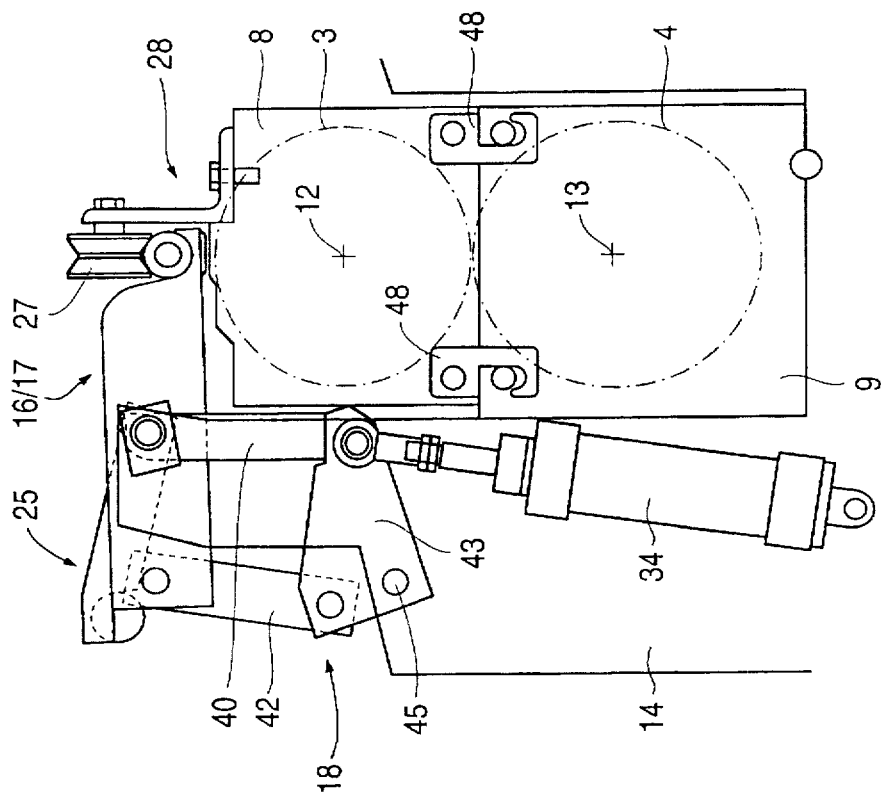
FIG. 5 A view from the side of the embodiment according to FIGS. 1 and 4 in the installed and removed position.

FIG. 5 refers to the position for the lifting mechanism 15, in which the cylinders 3, 4, (among experts also called slide-in units) are installed or removed from the machine column 14. It is discernible here that the perforation device 3 is lifted higher than for the position shown in FIG. 4, and that the detent pawl 40 is in the resting position. Before the detent pawl 40 can be shifted from the operating position, the articulated joint lever 43 must be released around its link axis 45 by pulling back the piston rod 44. Following that, the connecting element 25 can be pivoted to its operating position according to FIG. 5. As a result of this pivoting movement, the detent pawl 40 is lifted around it pivoting axis, so that it clears the way for the ejection movement of the piston rod 44.

Since the pivoting movement of the connecting element 25 is about 180° and that of the coupled blocking lever 40 is about 50°, a corresponding design measure must be taken, which is adjusted to this situation. In addition to the freely positioned detent pawl 40, a driver 46 is arranged on shaft 21, to which pivoting levers 36, 37 of connecting element 25 are rigidly connected, which driver is fixed on shaft 21 such that it cannot rotate. The latter comprises a plate and a driving pin that projects to the side. In the operating position for the detent pawl 40, the driving pin rests against the detent pawl 40 in accordance with FIG. 1, thereby keeping it in the blocking position, whereas during the non-operating position of detent pawl 40 or the operating position for the connecting element 25, the driving pin pushes onto a cam 47 on the detent pawl end (see FIG. 5) that is positioned opposite the pivoting axis of the detent pawl 40. The operating position for detent pawl 40 is achieved by swinging the connecting element 25 back and by the own weight of detent pawl 40. The brackets 48 provide the option of linking the cylinders 3, 4 for their joint transport.

We claim:

1. A web-fed rotary press for processing a web material, comprising:

a machine column;

a processing unit for one of perforating, punching and cutting the web material, the processing unit including for this purpose two counter-rotating, jointly operating working rollers having parallel rotational axes and between which the web material runs, the rollers having sides, and bearing housings supporting the working rollers at their sides and connecting the working rollers to the machine column; and a lifting mechanism, arranged on the machine column, for pre-stressing the working rollers in an operating position and for lifting off, installation and removal of the working rollers at their sides, the lifting mechanism including a lifting frame coupled to the working rollers and further including, respectively on both sides of the working rollers, a lever including a receptacle which is coordinated with the lifting frame and that can be operated to pivot around an axis, and an activation device coupled to the lever for activating the lever to pivot around the axis.

2. The press according to claim 1, wherein the lifting mechanism exerts a prestressing force onto the bearing housings of the working rollers, perpendicular to the rotational axes of the working rollers and progressing through a plane formed by the rotational axes of the working rollers.

3. The press according to claim 2, wherein each lever includes two arms each having opposing free ends coupled, respectively, to the activation device and the receptacle.

4. The press according to claim 3, wherein the respective lever ends coupled to the receptacle include a tensioning bracket facing the respective bearing housings which serves as a force buffer for the prestressing force.

5. The press according to claim 4, wherein the lifting mechanism includes a mechanical stop for setting a prestressed position for the levers.

6. The press according to claim 1, further including a sliding track running parallel to the rotational axis of one of the working rollers, wherein the receptacles for the levers form a component of the sliding track.

7. The press according to claim 6, wherein the sliding track includes a connecting element that can be placed between the receptacles.

8. The press according to claim 7, wherein the connecting element pivots from a non-operating position to the operating position for the sliding track in which the connecting element is supported by the bearing housings of the one working roller.

9. The press according to claim 8, further comprising a locking device linked to the connecting element and coordinated with the lifting mechanism and the activation device.

10. The press according to claim 9, wherein the locking device limits the non-operating position of the processing unit while the connecting element is in the non-operating position in which the joint operation of the working rollers is interrupted by separation of the working rollers.

11. The press according to claim 9, wherein the locking device comprises a detent pawl which is drive-connected to the connecting element.

12. The press according to claim 11, wherein the detent pawl comprises a stop that acts upon the activation device in the operating position.

13. The press according to claim 1, wherein the lifting mechanism includes a lifting element and the activation device includes a lever gear connected to the lifting element for placing the lever in a prestressing position so that the lever acts upon the processing unit for prestressing the working rollers.

14. The press according to claim 6, wherein the lifting frame includes two spaced-apart rollers, positioned to rotate freely on axes that are arranged at a right angle to the rotational axes of the working rollers, the spaced-apart rollers each having an approximately V-shaped cross section at a circumference that forms a support opposite the sliding track.

15. The press according to claim 6, wherein at least one of the receptacles includes a connecting device presenting a side extension of the sliding track.

* * * * *